United States Patent
Gennasio et al.

(10) Patent No.: US 10,215,319 B2
(45) Date of Patent: Feb. 26, 2019

(54) QUICK COUPLING FOR FLUID UNDER PRESSURE

(71) Applicant: Alfa Gomma S.p.A., Vimercate (IT)

(72) Inventors: Enrico Gennasio, Vimercate (IT); Stefano Mazzoli, Mezzago (IT); Rinaldo Doi, Merlino (IT)

(73) Assignee: ALFA GOMMA S.P.A., Vimercate (Monza Brianza) (IT)

( * ) Notice: Subject to any disclaimer, the term of this patent is extended or adjusted under 35 U.S.C. 154(b) by 0 days.

(21) Appl. No.: 15/509,023

(22) PCT Filed: Sep. 1, 2015

(86) PCT No.: PCT/EP2015/069906
§ 371 (c)(1),
(2) Date: Mar. 6, 2017

(87) PCT Pub. No.: WO2016/037890
PCT Pub. Date: Mar. 17, 2016

(65) Prior Publication Data
US 2017/0261140 A1    Sep. 14, 2017

(30) Foreign Application Priority Data
Sep. 8, 2014   (IT) .............. MI2014A1550

(51) Int. Cl.
*F16L 37/34*   (2006.01)
*F16L 37/23*   (2006.01)

(52) U.S. Cl.
CPC .............. *F16L 37/34* (2013.01); *F16L 37/23* (2013.01)

(58) Field of Classification Search
CPC . F16L 37/34; F16L 37/35; F16L 37/32; F16L 37/30; F16L 37/28; F16L 37/23;
(Continued)

(56) References Cited

U.S. PATENT DOCUMENTS

| 4,614,348 A | 9/1986 | Fournier |
|---|---|---|
| 5,123,446 A | 6/1992 | Haunhorst et al. |
| 6,962,347 B2 * | 11/2005 | Smith, III ............... E21B 17/02 137/614.04 |

OTHER PUBLICATIONS

PCT International Search Report and Written Opinion dated Nov. 17, 2015 issued in PCT International Application No. PCT/EP2015/089906.

* cited by examiner

*Primary Examiner* — Michael R Reid
(74) *Attorney, Agent, or Firm* — Troutman Sanders LLP

(57) ABSTRACT

The quick coupling for fluid under pressure, comprising a hollow valve body, an obturator stem slidable along an axis of the valve body in contrast and by the action of elastic means configured and arranged to automatically arrange said obturator stem in a closing position of the valve body, and hydraulic sealing means between the valve body and a cylindrical terminal of the obturator stem, the hydraulic sealing means comprising at least one hollow plain bearing for reducing friction having an internal cylindrical surface mateable with the terminal of the obturator stem, and a plurality of elastic elements independent from one another configured and arranged to strain the bearing at a radial compression force for the uniform hydraulic seal against the terminal, the elastic elements being distributed at least mainly along the extension of the bearing in the direction of the axis.

11 Claims, 1 Drawing Sheet

(58) Field of Classification Search
CPC ..... Y10T 137/87925; Y10T 137/87941; Y10T 137/87949; Y10T 137/87957
USPC ............ 137/614, 614.02–614.04; 251/149.1, 251/149.6, 149.9
See application file for complete search history.

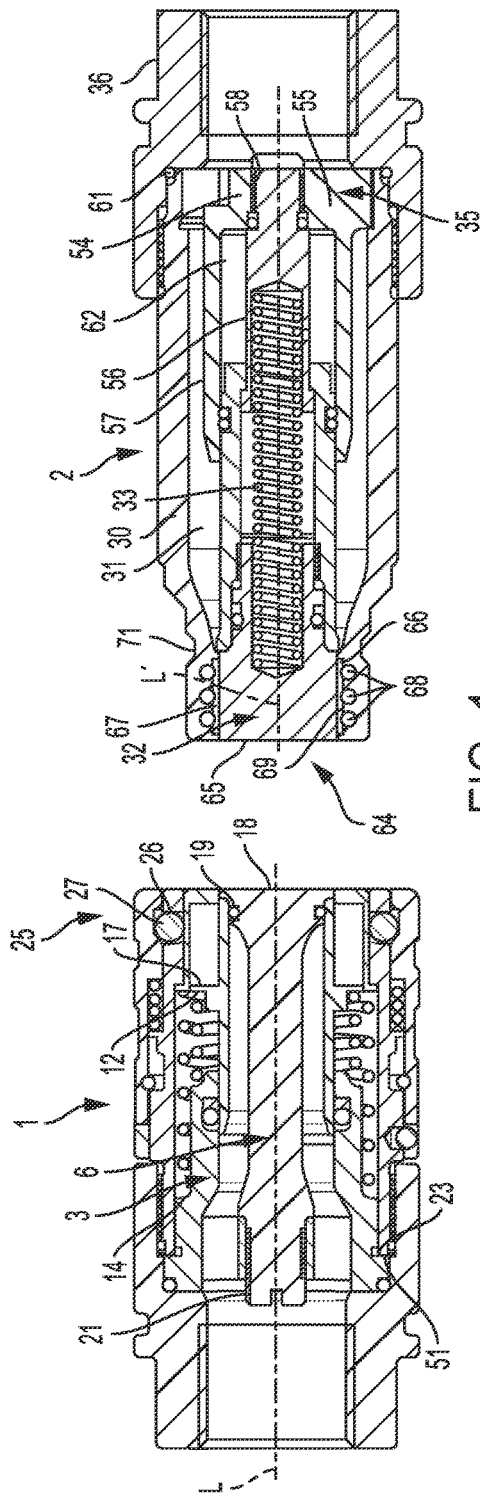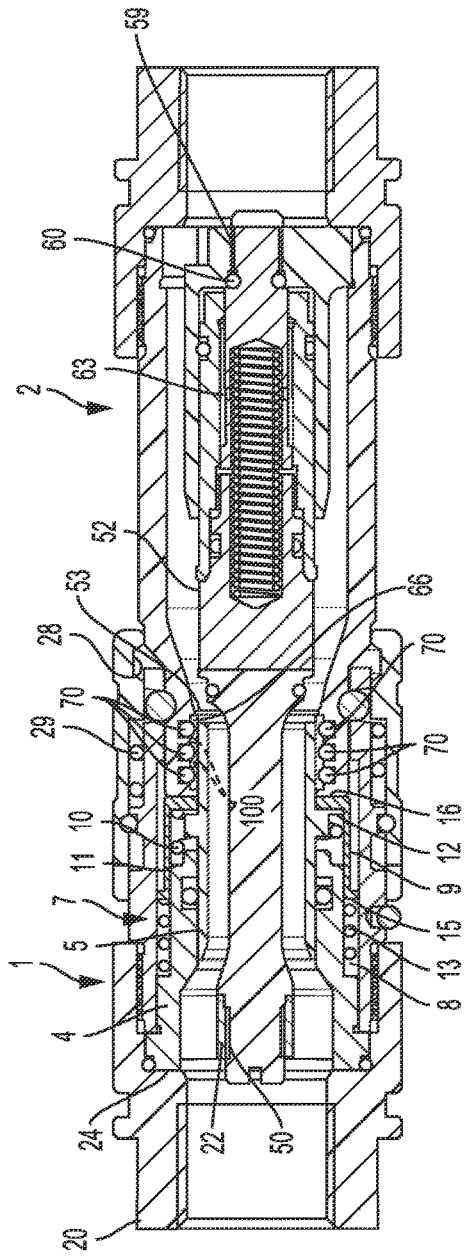

QUICK COUPLING FOR FLUID UNDER PRESSURE

CROSS-REFERENCE TO RELATED APPLICATIONS

This is a U.S. national phase application under 35 U.S.C. § 371 of International Patent Application No. PCT/EP2015/069906, filed Sep. 1, 2015, and claims benefit of priority to Italian Patent Application No. MI2014A 001550, filed Sep. 8, 2014. The entire contents of these applications are hereby incorporated by reference.

FIELD OF TECHNOLOGY

The present invention relates to a quick coupling for fluids under pressure, particularly hydraulic or oil dynamic, to be used in agricultural and industrial applications.

More in particular, it relates to a quick coupling for fluids under pressure comprising a valve body having an axial cavity in which an obturator stem is elastically strained to perform a relative movement with respect to the valve body between an opening position and a closing position of an axial passage of fluid through the cavity.

BACKGROUND

The quick coupling can be coupled with another coupling, and the reciprocal locking is obtained in general through a ring nut supported by the female coupling. In the disconnected condition the coupling normally has the obturator in the closing position of the passage which only opens by effect of the engagement between the couplings.

Couplings of this kind are designed to allow engagement between couplings even when there is a fluid under pressure in one or both of them.

One of the drawbacks that may sometimes arise in couplings of this type consists of the fact that it may be very difficult to make the engagement if during penetration between the male coupling and the female coupling one of the two opens before the hydraulic seal has been established with the other one.

This circumstance may cause a flow inversion and flow rate peaks to arise that hinder the correct engagement between the couplings with a consequent leak of fluid that may also cause pollution for the surrounding environment.

SUMMARY

The technical task of the present invention is, therefore, to provide a quick coupling for fluids under pressure which obviates the above-described technical drawbacks of the prior art.

Within the scope of this technical task an object of the invention is to provide a quick coupling for fluids under pressure that can be easily engaged and without fluid leaks with a mated type coupling.

The technical task, in addition to these and other objects, according to the present invention are reached by providing a quick coupling for fluid under pressure, comprising a hollow valve body, an obturator stem slidable along an axis of the valve body in contrast and by the action of elastic means configured and arranged to automatically arrange said obturator stem in a closing position of said valve body, and hydraulic sealing means between the valve body and a cylindrical terminal of the obturator stem, characterised in that said hydraulic sealing means comprise at least one hollow plain bearing for reducing friction having an internal cylindrical surface mateable with the terminal of the obturator stem, and a plurality of elastic elements independent from one another configured and arranged to strain the bearing at a radial compression force for the uniform hydraulic seal against the terminal, said elastic elements being distributed at least mainly along the extension of the bearing in the direction of said axis.

In a preferred embodiment of the invention the elastic elements comprise annular gaskets.

In a preferred embodiment of the invention the elastic elements comprise at least two O-rings.

In a preferred embodiment of the invention the bearing is shaped like a cylindrical bushing.

In a preferred embodiment of the invention the bearing is housed in a housing provided on the internal surface of the valve body.

In a preferred embodiment of the invention the housing has a plurality of grooves each housing a corresponding elastic element.

In a preferred embodiment of the invention the grooves extend along orthogonal circumferences to the axis of the obturator stem and equidistanced in the direction of said axis.

In a preferred embodiment of the invention the bearing is made of bronze filled PTFE.

In a preferred embodiment of the invention the elastic elements have a different elastic coefficient to compensate for the effects of the variation in fluid pressure to which the sealing means are exposed in the direction of the axis of the valve body. In a preferred embodiment of the invention the bearing has through holes through its wall thickness to compensate for the variation in fluid pressure to which the sealing means are exposed in the direction of the axis of the valve body.

In a preferred embodiment of the invention the coupling is of the flat head male type. The present invention also reveals a set comprising such a male quick coupling under pressure and a female quick coupling of the mated type couplable with the male coupling, characterised in that said hydraulic sealing means have an axial extension at least sufficient to create a seal between the male coupling and the female coupling before releasing the seal against the obturator stem of the male coupling during the coupling step between the male coupling and the female coupling.

BRIEF DESCRIPTION OF THE DRAWINGS

Further characteristics and advantages of the invention will more fully emerge from the description of a preferred but not exclusive embodiment of the quick coupling for fluids under pressure according to the invention, illustrated by way of indicative and non-limiting example in the accompanying drawings, in which:

FIG. 1 and respectively FIG. 2 show an axial sectional view of a male quick coupling for fluid under pressure uncoupled and coupled with a female quick coupling having a construction known in the prior art.

DETAILED DESCRIPTION

With reference to the cited figures, a female quick coupling 1 known in the state of the art and a special male quick coupling 2 for fluid under pressure are shown. The female coupling 1, as mentioned of the known type, comprises a hollow longitudinal valve body 3 having at least a first valve body part 4 and a second valve body part 5 coaxially movable with respect to the first valve body part 4, and an obturator stem 6 positioned in the valve body 3 coaxially to the longitudinal axis L of the valve body 3.

A hollow longitudinal body 7 containing the valve body 3 is arranged coaxially to the valve body 3 and defines with the valve body 3 a space 8 in which a sleeve 9 is arranged for driving the second part 5 of the valve body 3.

The sleeve 9 is oriented coaxially to the longitudinal axis L of the valve body 3 and has at its front end an internal flange 16 and at its base end an external flange 15.

The internal flange 16 of the sleeve 9 is engageable against a shoulder 17 of the second part of the valve body 5 for driving it.

The second part of the valve body 5 is movable with respect to the first part of valve body 4 in contrast and by the action of a first helical spring 10 positioned in the space 8 coaxially to the longitudinal axis L of the valve body 3 and interposed between the first part of valve body 4 and the second part of valve body 5.

The first helical spring 10 more in particular is positioned between an external support shoulder 11 of the first part of valve body 4 and an external support shoulder 12 of the second part of valve body 5.

The sleeve 9 is movable with respect to the valve body 3 in contrast and by the action of a second helical spring 13 positioned in the space 8 coaxially and externally to the first helical spring 10 and interposed between the sleeve 9 and the first part of valve body 4.

The second helical spring 13 more in particular is positioned between an external support shoulder 14 of the first part of valve body 4 and an external support shoulder 15 of the sleeve 9.

The stem 6 has a flat head 18 and a threaded base 21 screwed into a threaded hole 50 of a support with radial septa 22 that extend in a single piece into the cavity of the first part of valve body 4 from the base end of the latter. The radial septa construction of the support 22 allows the passage of the flow in the axial direction L of the valve body 3.

The first part of valve body 4 is locked in position by effect of tightening its base end against an internal shoulder 24 of an adaptor 20 screwed to an external thread of the containment body 7, and of an external shoulder 51 thereof against an internal shoulder 23 of the containment body 7.

In the closing position of the passage of fluid through the cavity of the valve body 3 the head 18 of the stem 6 is perimetrally in contact with the front end of the valve body 3 and through a gasket 19 it guarantees the hydraulic seal.

In the opening position of the passage of fluid through the cavity of the valve body 3, by effect of the relative movement between the stem 6 and the valve body 3, the head 18 is detached and advanced with respect to the front end of the valve body 3. The containment body 7 has a ring nut 25 for locking the connection of the female coupling 1 with the male coupling 2, and through conical housings 26 where balls 27 are freely housed.

The ring nut 25 internally has a perimetral circumferential groove 28 that can be aligned with the conical housings 26, and is activatable in contrast and by the action of a helical spring 29 interposed between the ring nut 25 itself and the containment body 7.

The male coupling 2 comprises a valve body 30 extending along a longitudinal axis L' and having a cavity 31 that extends along the entire length of the valve body 30, and an obturator stem 32 positioned in the cavity 31 coaxially to the axis L' and movable with respect to the valve body 30 along the axis L' in contrast and by the action of elastic means, for example a helical spring 33, configured and arranged to automatically arrange the obturator stem 32 in a closing position of the valve body 30. In the closing position the obturator stem 32 has a flange 52 thereof positioned against a stopping abutment 53 provided within the valve body 30.

A centring and guiding element 35 for the stem 32 is tightened between the valve body 30 and an adaptor 36 screwed to an external thread of the valve body 30. The hydraulic seal between the valve body 30 and the adaptor 36 is ensured by a sealing gasket 61.

The centring and guiding element 35 comprises a support base 54 having radial septa 55 which allow the passage of flow in the direction of the axis L' of the valve body 30, and a guiding structure comprising an internal guide bushing 56 and an external guide bushing 57 coaxial to the axis L' and delimiting a gap 62 in the direction of the axis L'.

The radial septa 55 are tightened at their external radial ends between the valve body 30 and the adaptor 36.

The internal guide bushing 56 is fixed with one of its threaded ends 58 into a threaded central hole 59 in the support base 54.

The hydraulic seal between the threaded end 58 and the threaded hole 59 is ensured by a sealing gasket 60.

The external guide bushing 57 is made as a single piece with the support base 54. The obturator stem 32, axially hollow, is fitted onto the internal guide bushing 56 and is slidable along the gap 62 axially present between the internal guide bushing 56 and the external guide bushing 57.

The wall of the internal guide bushing 56 is equipped with through holes 63 for bleeding the pressure contained in the variable volume chamber delimited between the obturator stem 32 and the internal guide bushing 56.

The helical spring 33 is interposed between the obturator stem 32 and the centring and guiding element 35, and in particular has a first end inserted in the axial cavity of the obturator stem 32 and a second end inserted in the internal guide bushing 56. The obturator stem 32 has a cylindrical terminal 64 with a flat head 65.

The cylindrical surface of the obturator stem 32 is coaxial to the axis L' of the valve body 30.

The coupling 2 advantageously envisages hydraulic sealing means between the valve body 30 and the cylindrical terminal 64 of the obturator stem 32, comprising a hollow plain bearing 66 for reducing the friction having a cylindrical internal surface 67 matable with the cylindrical surface of the terminal 64 of the obturator stem 32, and elastic elements 68, three in the illustrated solution, independent from one another and configured and arranged to strain the bearing 66 at a radial compression force for the uniform hydraulic sealing against the cylindrical surface of the terminal 64.

The bearing 66 is preferably made of bronze filled PTFE.

The bearing 66 has the shape of a cylindrical bushing and is housed projecting into a housing 69 having a complementary shape provided on the internal surface of the valve body 30 in an adjacent position to the front end of the valve body 30.

The housing 69 has on the bottom a plurality of grooves 70 each housing a corresponding elastic element 68.

The grooves 70 are distributed along most of the extension of the bearing 66 in the direction of the axis L' to increase as much as possible the extension of the seal in the direction of axis L'.

The grooves 70 are equidistanced and aligned in the direction of the axis L' and extend along circumferences orthogonal to the axis L\

The elastic elements 68, identical in shape and size, are comprised of annular gaskets, in particular O-rings, each housed in a corresponding groove 70.

The depth of the grooves 70 is less than the diameter of the section of the elastic elements 68 so that the elastic elements 68 can project out of the grooves enough to exercise the compression action on the bearing 66.

Further improvements can be made to the hydraulic sealing means to keep in consideration the fluid pressure variation to which they are exposed in the direction of the axis L\

In fact, such fluid pressure in the illustrated solution tends to increase progressively from an almost null value at the end of the sealing means facing the front end of the valve body 30 to a maximum value at the end of the sealing means facing the base end of the valve body 30.

In a possible different solution in accordance with the invention, to compensate for the effects of the pressure variation, the elastic elements 68 may not be identical but different from one another in terms of the elastic coefficient that is connected with the trend of the fluid pressure: the most external elastic element 68 therefore has the lowest elastic coefficient, the most internal elastic element 68 the highest elastic coefficient and the intermediate elastic element 68 an elastic coefficient between the highest and the lowest ones.

In a further possible solution in accordance with the invention, to compensate for the pressure variation, calibrated through holes 100 can be applied to the bearing 66 passing through its wall thickness. Such calibrated holes, placing the gaps between the bearing 66 and the elastic elements 68 in fluid communication, tend to reduce or eliminate the pressure difference present in such gaps.

The compensation for the pressure variation or the effects of the pressure variation in the direction of the axis L' allows the onset of local differentiated strain on the bearing 66 to be prevented, which could cause undesired deformations and compromise its correct operation.

In this way the sealing means may perform their action effectively and uniformly along their whole axial extension.

As will be seen, the sealing means that are able to offer an effective and uniform seal for a suitable length in the direction of axis L' of the axial valve body 30, guarantee the creation of a seal between the male coupling 2 and the female coupling 1 before the release of the seal against the obturator stem 32 of the male coupling 2 during the coupling step between the male coupling under pressure 2 and the female coupling 1, which is in turn under pressure or not.

The engagement between the male coupling 2 and the female coupling 1 can therefore be performed very easily and conveniently and does not cause fluid leaks. The engagement between the female quick coupling 1 and the male quick coupling 2 takes place in the following way.

Prior to the engagement, the male quick coupling 2 is in a configuration in which the obturator stem 32 is kept by the spring 33 against the valve body 30 closing the axial passage of the fluid through the valve body 30, and the bearing 66 is engaged with the whole of its internal surface against the terminal 64 of the obturator stem 32.

Prior to the engagement, the female coupling 1 is in a configuration in which the spring 10 keeps the second part 5 of the valve body 3 protracted against the head 18 of the obturator 6 in the closing position of the axial passage of fluid through the valve body 3, and in which the spring 13 keeps the sleeve 9 protracted in a position flush with the head 18 of the obturator 6.

During the axial thrust of the operator for the engagement, the front end of the valve body 30 of the male coupling 2 contrasts the internal flange 16 of the sleeve 9 of the female coupling 1 and pushes it causing the retraction of the sleeve 9 with respect to the second part 5 of the valve body 3 that initially remains stationary. The sleeve 9 at a certain point in its retraction stroke intercepts with its internal flange 16 the external shoulder 17 of the second part 5 of the valve body 3 which in turn starts to retract with respect to the fixed obturator stem 6 opening the axial passage for the fluid through the valve body 3.

During the axial thrust of the operator for the engagement, the front end of the obturator stem 32 of the male coupling 2 also contrasts the front end 18 of the stationary obturator stem 6 of the female coupling 1 from which it is pushed to retract into the valve body 30 until the axial passage is opened for the fluid through the valve body 30.

It must be noted that during the penetration of the valve body 30 of the male coupling under pressure 2 into the female coupling 1 and the resulting backwards stroke of the obturator stem 32, the bearing 66 slides with low friction along the terminal 64 of the obturator stem 32 and is engaged against the second part 5 of the valve body 3 of the female coupling 1 long before releasing the seal against the terminal 64 of the obturator stem 32 of the male coupling 2. In practice, during the coupling the bearing 66, initially selectively engaged against the terminal 64 of the obturator stem 32, assumes intermediate positions in which it simultaneously engages the terminal 64 of the obturator stem 32 and the second part 5 of the valve body 3 and ensures the seal against both parts to prevent fluid leaking outwards when the male coupling 2 opens.

To lock the engagement between the female coupling 1 and the male coupling 2, the ring nut 25 is activated.

Initially the groove 28 is aligned with the housings 26 in which the balls 27 are locked for the retention exerted by the sleeve 9. The balls 27 hold the ring nut 25 in position. The subsequent penetration of the male coupling 2 into the female coupling 1 causes the movement of the sleeve 9 until an external perimetral groove 71 of the valve body 30 of the male quick coupling 2 is aligned with the housings 26. In this coupled configuration, the balls 27 project into the groove 71 and free the ring nut 25 which, by effect of the distension of the spring 29, protract towards the male coupling 2. The protraction of the ring nut 25 causes the staggering of the groove 28 from the housings 26 with the result that the balls 27 remain trapped in the groove 71 from which they no longer have the possibility to exit except by retracting the ring nut 25 to realign the groove 28 with the housings 26.

The quick coupling as conceived herein is susceptible of numerous modifications and variants, all falling within the scope of the inventive concept; furthermore, all the details are replaceable by technically equivalent elements.

The materials used, as well as the dimensions, may in practice be of any type, according to needs and the state of the art.

The invention claimed is:

1. A quick coupling for fluid under pressure, comprising:
    a hollow valve body,
    an obturator stem slidable along an axis of the valve body in contrast and by the action of an elastic element configured and arranged to automatically arrange said obturator stem in a closing position of said valve body, and a hydraulic seal between the valve body and
    a cylindrical terminal of the obturator stem, wherein said hydraulic seal comprises at least one hollow plain bearing reducing friction having an internal cylindrical surface mateable with the terminal of the obturator stem, and a plurality of second elastic elements independent from one another configured and arranged to strain the bearing at a radial compression force for the uniform hydraulic seal against the terminal, said second elastic elements being distributed at least mainly along the extension of the bearing in the direction of said axis, wherein said bearing has through holes through its wall thickness.

2. The quick coupling for fluid under pressure according to claim 1, wherein said second elastic elements comprise annular gaskets.

3. The quick coupling for fluid under pressure according to claim 1, wherein said second elastic elements comprise at least two O-rings.

4. The quick coupling for fluid under pressure according to claim 1, wherein said bearing exhibits a configuration of a cylindrical bushing.

5. The quick coupling for fluid under pressure according to claim 1, wherein said bearing is housed in a housing provided on the internal surface of the valve body.

6. The quick coupling for fluid under pressure according to claim 5, wherein said housing has a plurality of grooves each receiving a corresponding elastic element.

7. The quick coupling for fluid under pressure according to claim 6, wherein said grooves extend along orthogonal circumferences to said axis and equidistanced in the direction of said axis.

8. The quick coupling for fluid under pressure according to claim 1, wherein said bearing is made of bronze filled PTFE.

9. The quick coupling for fluid under pressure according to claim 1, wherein said second elastic elements have a different elastic coefficient.

10. The quick coupling for fluid under pressure according to claim 1, comprising a flat head male quick coupling.

11. A set comprising the quick coupling of claim 1 as a male quick coupling under pressure and a female quick coupling of the mated type couplable with the male coupling, wherein a second hydraulic seal has an axial extension at least sufficient to create a seal between the male coupling and the female coupling before releasing the seal against the obturator stem of the male coupling during a coupling step between the male coupling and the female coupling.

* * * * *